United States Patent [19]
Hardison

[11] 3,910,500
[45] Oct. 7, 1975

[54] DRIP IRRIGATION SYSTEM AND COMPONENTS THEREOF

[75] Inventor: Artson P. Hardison, Glendora, Calif.

[73] Assignee: Xeros Controls, Azusa, Calif.

[22] Filed: Sept. 28, 1973

[21] Appl. No.: 401,804

[52] U.S. Cl. ............ 239/310; 239/DIG. 1; 239/542
[51] Int. Cl.² ... A62C 5/02; B05B 7/26; B05B 15/00
[58] Field of Search .......... 239/145, 542, 590.3, 76, 239/74, DIG. 1, 575, 271, 272; 261/95; 210/503

[56] References Cited
UNITED STATES PATENTS

| | | | |
|---|---|---|---|
| 2,580,696 | 1/1952 | Novak | 239/74 |
| 2,598,961 | 6/1952 | Andrus | 239/542 |
| 2,979,075 | 4/1961 | Hartley et al. | 239/310 |
| 3,669,357 | 6/1972 | Overbey | 239/272 |

*Primary Examiner*—Lloyd L. King
*Attorney, Agent, or Firm*—Donald D. Mon

[57] ABSTRACT

A drip irrigation system comprising in combination an inlet conduit to receive a supply of water to be distributed, a sand filter system adapted to be backwashed connected to the inlet conduit, a manifold receiving filtered water from the sand filter system, a plurality of distribution conduits connected to receive water from the manifolds, and at least one emitter connected to each distribution conduit for emitting water therefrom. Optional features of the invention include: a penetrable plug disposed in at least one of the distribution conduits, the plug being penetrable by a probe for measuring pressure in the respective distribution conduit and being self-sealing to close the puncture caused by the penetration after the plug is removed; the inclusion of at least two sand filters in the sand filter system whereby one can be backwashed while the other continues to supply water to the irrigation system so that irrigation does not cease during the backwashing; and the provision of retention screens downstream of the sand filters adjacent to which a sight-glass is provided for visual inspection of the condition of the upstream sand filter.

35 Claims, 12 Drawing Figures

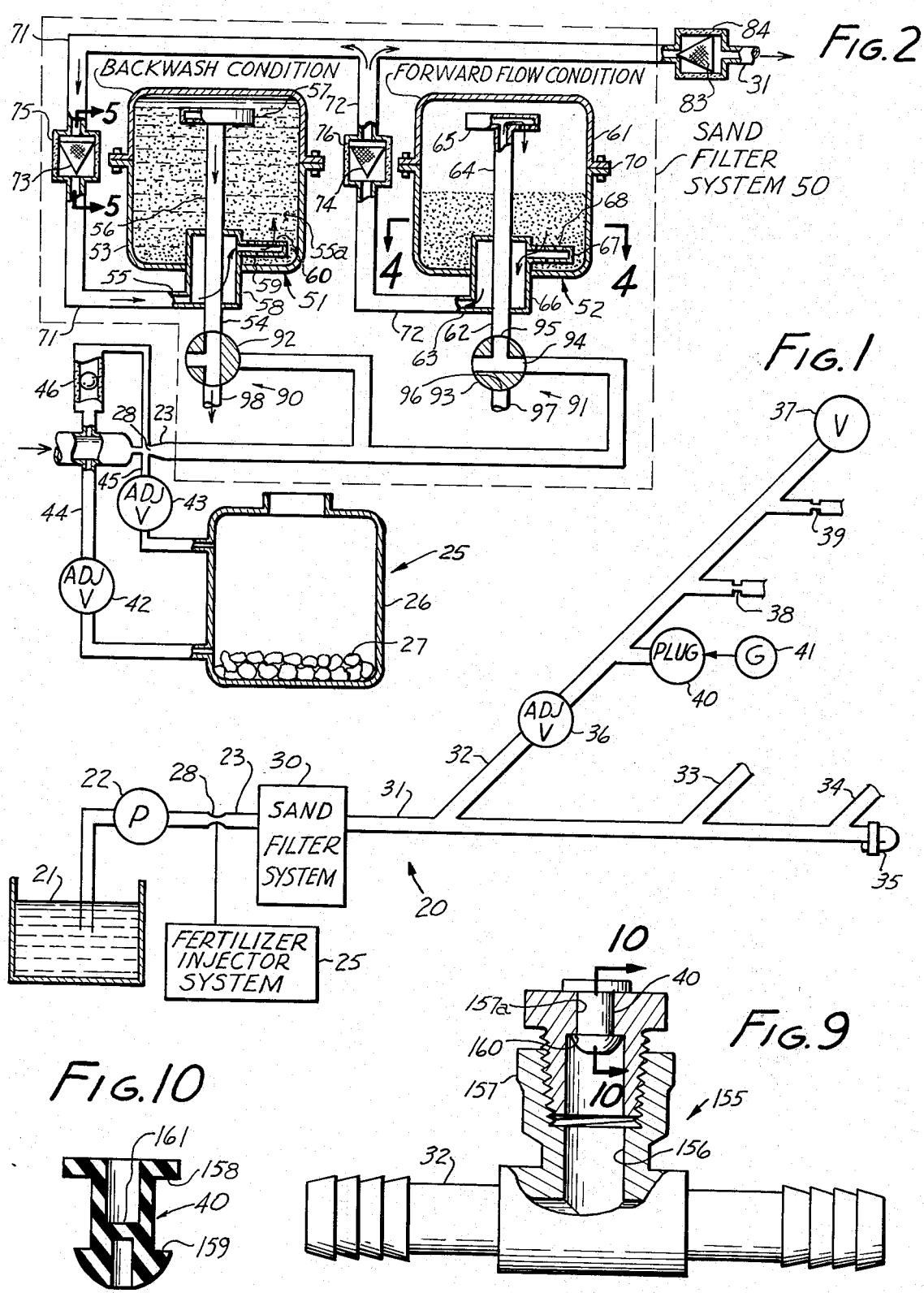

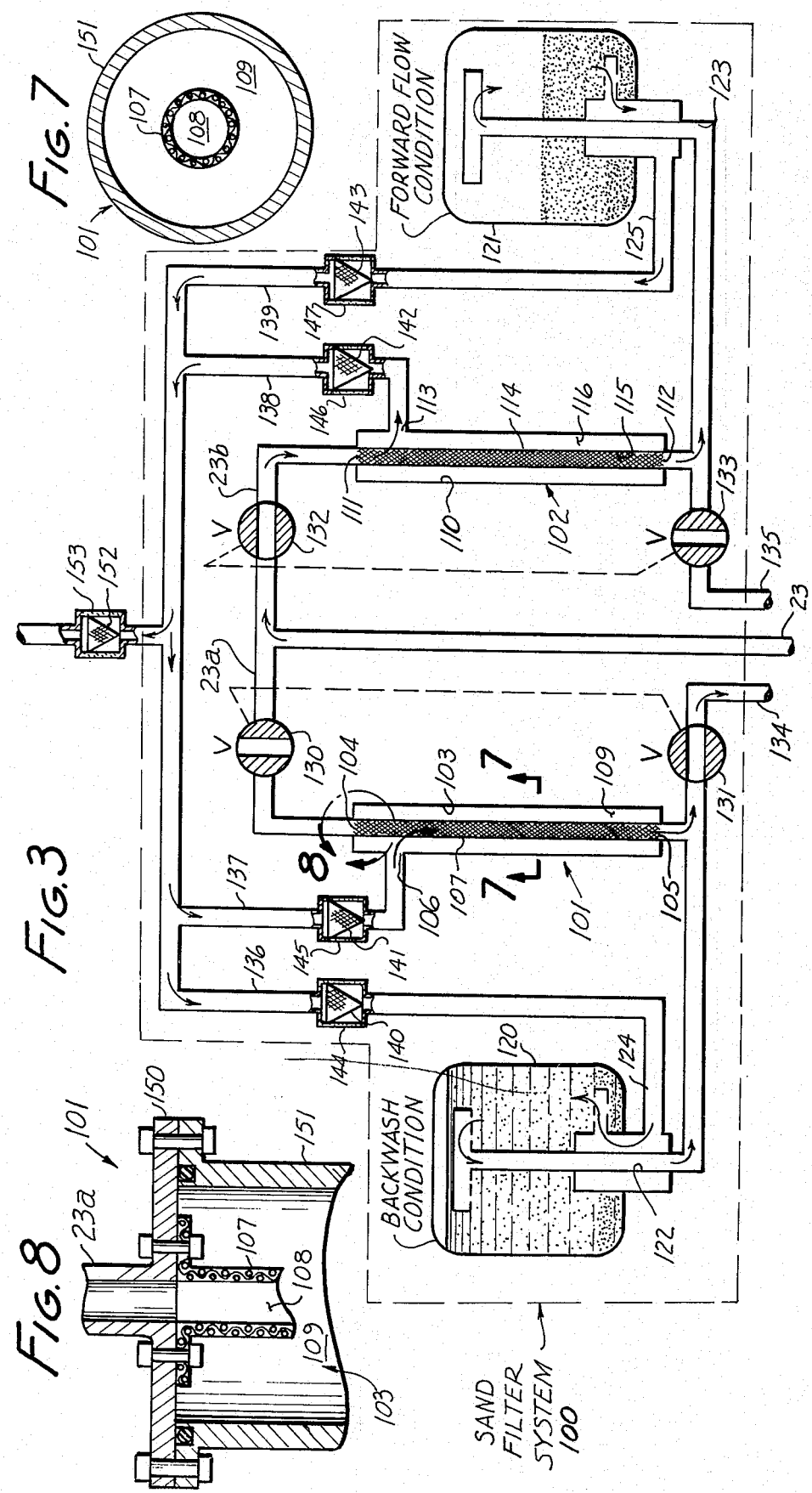

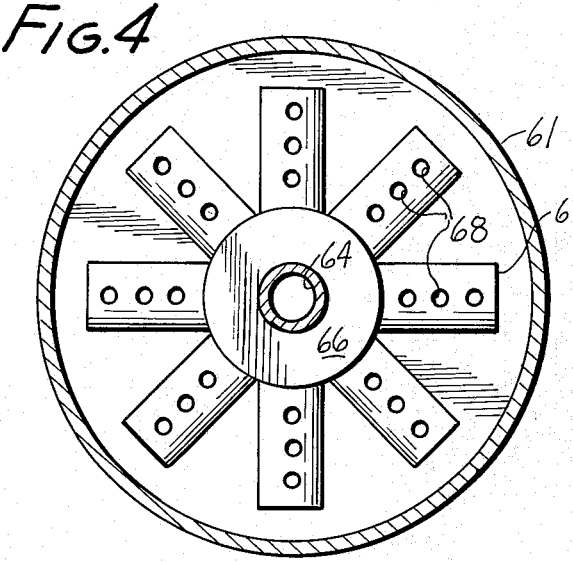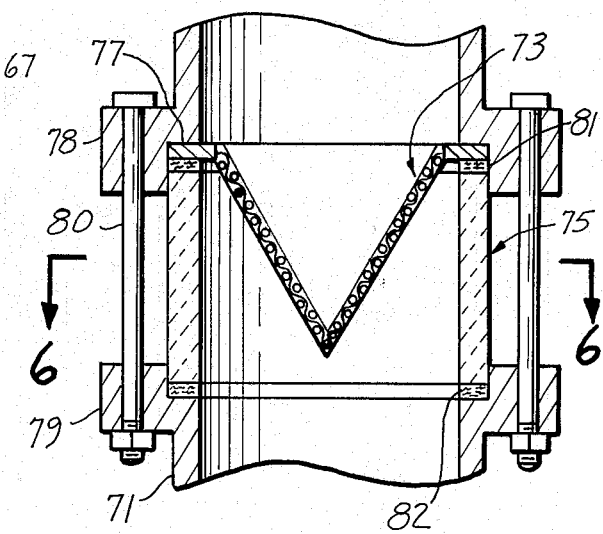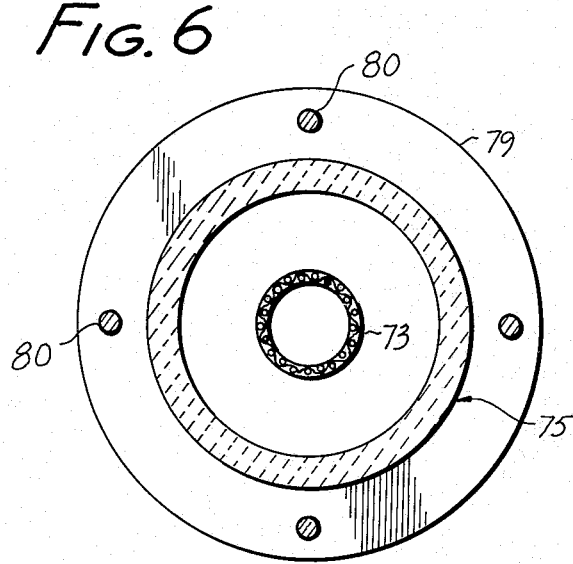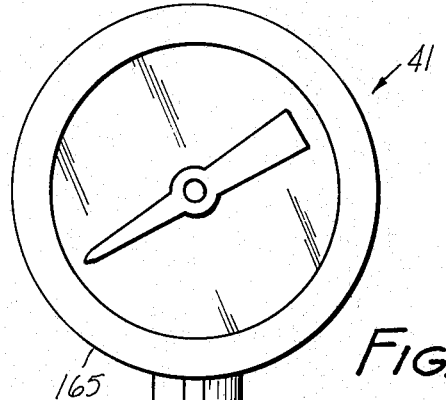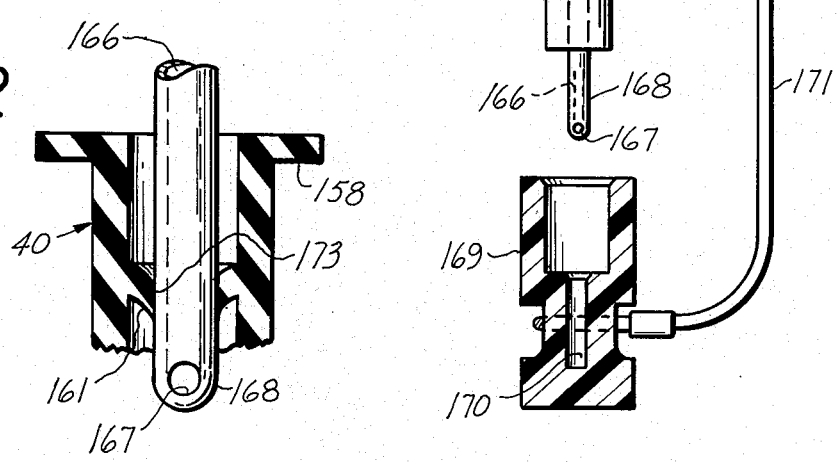

DRIP IRRIGATION SYSTEM AND COMPONENTS THEREOF

This invention relates to the field of drip irrigation wherein water is applied at a very slow rate to plants and crops.

The art of drip irrigation has recently become of increasing importance throughout the world because it can provide sufficient irrigation for plants and crops, not only with the use of less total water than required by conventional irrigation techniques, but also using water of greater salinity. A disadvantage of drip irrigation systems is that they oridinarily utilize conventional water supplies such as irrigation ditches and wells which carry considerable particulate matter. In conventional irrigation systems, the lines are so large that the particulate matter is carried through it without complication. However, drip irrigation utilizes very fine tubing, often flexible plastic tubing with a bore as small as 0.030 inches diameter, and control components which have small orifices. Grains of sand which are tolerable in conventional systems can cause total failure of a drip irrigation system by clogging it. Even a single grain of sand can cause clogging of many known emitters. Therefore, it is important to remove particulate material from water which is to be used in drip irrigation, but without requiring frequent servicing of equipment, or causing excessive pressure drops in the system.

Accordingly, it is an object of this invention to provide a drip irrigation system in which the delivered water will be filtered substantially free of particulate matter of troublesome size and still flow through the system with a relatively low-pressure loss.

Optional objectives of the invention are to provide a drip irrigation system with features for adjustment and control such as a penetrable self-sealing plug and a gauge with a probe adapted to penetrate the plug for measuring the pressure in distribution conduits; dump valves for draining distribution conduits; and filter arrangements wherein a portion of a sand filter system can be backwashed while another portion of the system continues to supply filtered water for irrigation.

A drip irrigation system according to this invention comprises in combination: an inlet conduit to receive a supply of water to be distributed, a sand filter system adapted to be backwashed connected to said inlet conduit, a manifold receiving filtered water from said filter system, a plurality of distribution conduits connected to, and receiving water from the manifold, and at least one emitter connected to each distribution conduit for emitting water therefrom.

According to a preferred but optional feature of the invention, a penetrable plug is disposed in at least one of said distribution conduits, said plug being penetrable by a probe for measuring pressure in said distribution conduit. The plug is self-sealing to close the puncture after the probe is removed.

According to still another preferred but optional feature of the invention, the sand filter system comprises at least two sand filters which are optionally operable for the simultaneous supply of filtered water, or for one to remain in a forward flow condition for water supply and backwashing of the other, while the other is in a backwash condition being backwashed by filtered water.

Yet another preferred but optional feature of the invention resides in the provision of downstream retention screens together with sight-glasses for visual inspection of the condition of said retention screens to assure that respective upstream filter means have not broken down.

According to still another preferred but optional feature of the invention, a pre-filter is provided in combination with a sand filter. The pre-filter has a chamber with an inlet port and a first and a second outlet port. A screen divides this chamber into a flow chamber and an outlet chamber. The first outlet port discharges from the flow chamber and the second outlet port discharges from the outlet chamber. The second outlet port is connected to the outlet of the sand filter, the inlet port is connected to the inlet conduit, and the first outlet port is connected to the inlet of the sand filter. With such an arrangement, a high-rate pre-filtration to a clarity even greater than that provided by the sand filter can be attained for rapid flow, while a portion of the water, which carries particulate matter removed by the prefiltration, is filtered in a sand filter.

The above and other features of this invention will be fully understood from the following detailed description and the accompanying drawings in which:

FIG. 1 is a schematic view of the presently preferred drip irrigation system according to the invention;

FIG. 2 is a side elevation, partly in schematic and partly in cutaway cross-section, showing the presently preferred embodiment of a sand filter system for use in the system of FIG. 1;

FIG. 3 is another side view, partly in schematic and partly in cutaway cross-section notation, showing yet another sand filter system useful in the drip irrigation system of FIG. 1;

FIG. 4 is a cross-section taken at line 4—4 of FIG. 2;

FIG. 5 is a cross-section taken at line 5—5 in FIG. 2;

FIG. 6 is a cross-section taken at line 6—6 in FIG. 5;

FIG. 7 is a cross-section taken at line 7—7 in FIG. 3;

FIG. 8 is a fragmentary axial cross-section taken at the region illustrated as section 8 in FIG. 3;

FIG. 9 is a side elevation, partly in cutaway crosssection of a plug shown in FIG. 1;

FIG. 10 is a fragmentary cross-section taken at line 10—10 in FIG. 9;

FIG. 11 is a side elevation, partly in axial cross-section showing a gauge useful in this invention; and FIG. 12 is axial fragment of FIGS. 10 and 11.

A drip irrigation system 20, according to the invention is shown in FIG. 1. It obtains its water from a water supply 21 which might be an irrigation canal, a pond, a well, or the like. A pump 22 withdraws the water from the supply and supplies it under pressure to an inlet conduit 23. The inlet conduit may optionally include a fertilizer injector system 25, best shown in FIG. 2, which includes a tank 26 in which solid fertilizer 27 can gradually be dissolved by water in the tank and withdrawn by means of an injector 28. The injector may be a common venturi device which will be shown in greater detail later. Alternately, liquid fertilizer may be supplied to the tank, rather than a soluble solid.

The drip irrigation system includes a sand filter system 30 which will be further described with reference to FIGS. 2 and 3 below. The sand filter system discharges to a manifold 31. In turn, the manifold is branched by a plurality of distribution conduits 32, 33, 34. The end of the manifold may be closed such as by providing a crimp 35 at its end, or by capping it as preferred.

Because distribution conduits 32, 33, and 34 are essentially alike and ordinarily will differ only in the number of emitters, if they differ at all, only distribution conduit 32 will be described in detail. It includes an adjustable valve 36 which may conveniently be a needle type valve that can be adjusted to determine the rate of flow of water into the distribution conduit. A dump valve 37 may be provided at the end of the distribution conduit for enabling the flushing out or drainage of the distribution conduit. Alternative to the dump valve, the end may simply be folded over to form a crimp such as crimp 35 which can be uncrimped for the same purpose if desired.

A plurality of emitters 38, 39 (there may be any desired number of these) branch or discharge from the distribution conduit. These are small orifices which determine the relatively slow rate of flow of water out of the distribution conduit at their location. The emitters ordinarily are placed adjacent to a tree, plant, or other crop that is to be irrigated. The rate of flow may amount to only a gallon or two per day per emitter depending on the requirement for water. The flow is ordinarily sustained for a long period of time.

A plug 40 is connected to the distribution conduit and as will later be shown has a penetrable portion which can be penetrated by a probe carried by a gauge 41, all as will more fully hereinafter be disclosed.

The irrigation system as shown provides means for optionally injecting fertilizer, and for filtering the water to the high standards of filtration which can be provided by sand filters, for a close adjustment of pressure in the various distribution conduits, and for determining the resulting pressure in the distribution conduit in operation. The full details of the various portions of the system of FIG. 1 will now be described.

The fertilizer injector system, includes the said tank 26 and injector 28. Adjustable valves 42, 43 (FIG. 2) such as needle valves provide for the flow-through of water. A supply line 44 provides water to an opening near the bottom of the tank 26. An outlet line 45 connects to the throat of injector 28. The supply line is connected upstream into the higher pressure so that there is an assured supply of liquid (not shown) to the tank. A flowmeter 46 is connected across the upstream portion and throat of the venturi to measure the total flow of fluid through the drip irrigation system.

The preferred embodiment of sand filter system 50 is shown in FIG. 2. It is a filter system which can be directly placed in the system of FIG. 1 in place of the diagrammatically indicated sand filter system 30. It connects to the inlet conduit 23, which branches to two sand filters 51, 52. For convenience in disclosure, sand filter 51 is shown in its backwash condition while sand filter 52 is shown in its forward flow condition. To avoid complicating the drawings, water has not been shown throughout the drawings.

Sand filter 51 includes a shell 53 having an inlet 54, an outlet 55, and a filter bed 55a of "sand" for filtration. The inlet connects to a distributor pipe 56 and the distributor pipe discharges into the shell through a distributor 57, for example, a shower-head construction. The outlet 55 drains water from a central drain 58 which has a plurality of branches 59 with perforations 60 therein communicating with the inside of the shell.

Similarly, sand filter 52 has a shell 61, an inlet 62, an outlet 63, distributor pipe 64, a distributor 65, a drain 66, and branches 67 with perforations 68 just as in the sand filter 51. The shells may be adapted to be opened for cleaning and servicing by forming them into two parts, as shown. They may be joined at flanges 70 in filter 51, for example.

Outlet conduits 71, 72 are respectively connected to outlets 55 and 63.

Retention screens 73, 74 are respectively placed across outlet conduits 71 and 72. Sight-glasses 75, 76 are placed adjacent to the retention screens to provide for visual inspection of the condition of the retention screens. The retention screens are shown schematically in FIGS. 2 and 3 and in more detail in FIGS. 5 and 6. The device of FIGS. 5 and 6 is typical of all retention screens shown herein. As best shown in FIG. 5, the retention screen 73 is conical and is attached by flange 77 across the outlet conduit 71 by means of shoulders 78, 79 drawn together by fasteners 80. These shoulders draw the flange 77 tightly against a peripheral sealing ring 81. A second sealing ring 82 is provided at the other end of the cylindrical sight-glass 75 so as to form a compressive seal at both ends of the sight-glass. It will be noted that sand or particulate matter caught by the retention screen can be viewed through the sight-glass and that the condition of the retention screen can really be determined by visual examination. If the upstream sand filter fails and releases its filter bed, it will be caught on the retention screen and plug it.

The outlet conduits 71 and 72 connect to the manifold 31. Optionally, a retention screen 83 and sight-glass 84 may be provided in the manifold to check the entire system upstream of the manifold. This usually will be found to be unnecessary. However, it may be used instead of the retention screens 73 and 74.

Valving means 90, 91 comprise a pair of three-way valves 92, 93 each attached to the inlet conduit and therefor to each other. The three-way valves have three ports (only valve 93 will be described in detail, the valves being identical) port 94 connected to the inlet conduit, port 95 connected to the inlet of the sand filter, and port 96 connected to a flushing outlet 97. A flushing outlet 98 is connected to valve 92. Thw two optional positions of the three-way valves are shown in FIG. 1. Valve 92 is shown in the backwash condition and valve 93 is shown in the forward flow condition. In operation, the condition should not arise wherein both the sand filters are simultaneously on backwash. Both may simultaneously be in the forward flow condition. It is intended that one be backwashed while the other is in the forward flow condition, so that irrigation flow always occurs. The valves can be interlocked to create this arrangement if desired.

FIG. 3 shows another embodiment of sand filter system 100 which can be directly substituted in block 30 of FIG. 1. This system receives water from inlet conduit 23 which branches to form branches 23a, 23b. A pair of pre-filters 101, 102 receive water from the inlet conduit. Pre-filter 101 includes a chamber 103 which has an inlet port 104, a first outlet port 105 and a second outlet port 106. A screen 107 is preferably tubular in shape and provides essentially a porous "pipe" that divides the chamber into a flow chamber 108 (FIG. 8) inside the screen and an outlet chamber 109 outside the screen. The first outlet port discharges from the flow chamber and the second outlet port discharges from the outlet chamber.

Similarly, pre-filter 102 has a chamber 110, an inlet port 111, a first outlet port 112, a second outlet port 113. A tubular screen 114 divides chamber 110 into flow chamber 115 and outlet chamber 116. Again the first outlet port discharges from the flow chamber, and the second outlet port discharges from the outlet chamber. In both pre-filters, the tubular screen interconnects the inlet port and the first outlet port.

Two sand filters 120, 121 are provided with inlets 122, 123 and outlets 124, 125 respectively. Because the sand filters have the same construction as sand filter 51, no detailed description of them will be given at this point.

Valving means is provided for the pre-filters and sand filters. Off-on valves 130, 131 are effective as to pre-filter 101 and sand filter 120, while off-on valves 132, 133 are effective as to pre-filter 102 and sand filter 121. Valves 130 and 132 are effective to control flow through the inlet conduit branches 23a and 23b and valves 131 and 133 are effective to control flow through flushing outlets 134, 135. Outlet conduits 136, 137, 138, 139 respectively connect outlet 124, outlet part 106, outlet port 113, and outlet 125 to the manifold and to each other. It will thereby be seen that the pre-filters are connected in parallel with their respective sand filters.

Retention screens 140, 141, 142, and 143 together with adjacent sight-glasses 144, 145, 146 and 147 are placed across outlet conduits 136, 137, 138 and 139 respectively. These are in all details identical to the assembly shown in FIG. 5, so no further details of construction will be given at this point.

With respect to the precise construction of the pre-filters, a portion of pre-filter 101 is shown in greater detail in FIG. 8. There, its tubular screen 107 is shown attached to an end plate 150 which forms a portion of inlet conduit branch 23a. A tube 151 is shown for dividing chamber 103 which is divided by the screen into flow chamber 108 and outlet 109. It will be understood that a similar end construction will be provided at the bottom of the pre-filter in FIG. 3 and at both ends of pre-filter 102 also in FIG. 3. This is the means whereby the inlet port and first outlet port are interconnected through the flow chamber.

Optionally, a retention screen 152 and sight-glass 153 may be provided in the manifold itself to check the condition of the upstream system. This will ordinarily not be used, because a more localized check of the system is preferable.

Plug 40 is shown in full detail in FIG. 9. It is shown attached to a 90° side tapped coupling 155 in distribution conduit 32. As can be seen, the construction is readily adaptable to be manufactured as plastic parts, but if preferred it may be made of metal instead. The advantage of making the system of plastic as much as possible is because of the lesser tendency of dried salts to stick to plastic. In any event, a channel 156 is formed extending upwardly to a body 157 with an opening 157a to receive plug 40.

Plug 40 includes a pair of flanges 158, 159 (see FIG. 10) of such shape that it can be pressed into the opening where flange 159 hooks over a shoulder 160 so it will be held in place. The plug includes a diaphragm 161 which is puncturable. The plug may conveniently be made of an isoprene rubber on the order of one-sixteenth inch thickness which can readily be punctured by a probe but which will reseal itself when the probe is removed from the puncture. This construction is known in valves for athletic equipment such as for basketballs and footballs and requires no further detailed description here, other than to state that the diaphragm 161 is penetrable by probe for measuring pressure in the distribution conduit and self-sealing to close the puncture caused by the penetration after the probe is removed.

FIG. 11 shows a gauge 165 which includes a channel 166 to receive fluid to be measured from a hole 167 in probe 168. A protective cap 169 has a recess 170 to receive the probe and a strap 171 to hold the cap to the gauge body 172. The cap is removed while the gauge is in operation and replaced when it is not, so as to protect the gauge.

FIG. 12 shows the probe 168 penetrating diaphragm 161 forming a puncture 173 and placing hole 167 in the distribution conduit where it can receive water and measure its pressure. When the probe is removed the puncture will seal itself, and the system will again be fluid tight except through the emitters.

The operation of the irrigation system will now be described. In FIG. 1, the pump is placed in operation and fertilizer will be drawn into the system if the injection system is used. Water will be forced into the sand filter system where the particulate matter is removed in the filter bed, and filtered water is discharged into manifold 31. Thence, it flows to the various distribution conduits, and the adjustable valves 36 are adjusted to provide the desired rate of flow therethrough. Pressure may be measured by the use of the gauge as shown in FIG. 12. The dump valve will, of course, be closed during this time. It may be opened whenever the system is desired to be flushed, or drained.

From time to time, the pressure in the various distribution conduits can be checked out by the use of the gauge as shown. This plug and gauge combination is especially useful in the field because it does not require that gauges be provided which are resistive to the environment. Furthermore, accurate gauges may be carried and calibrated by the user rather than relying on field gauges which often lose their calibration rather soon. Pressure is measured by puncturing the plug with the probe and reading the gauge.

The sand filter system according to FIG. 2 may be placed in full forward flow condition by placing both of its three-way valves 92 and 93 in the illustrated condition of valve 93. In such event, flow of water from the inlet will be from the inlet conduit through the inlet of the sand filters, through the distributor, through the sand-bed where filtration takes place, through the outlet, through the retention screens, and into the manifolds.

Should backwashing be desired and occasionally it will be, then the respective three-way valve will be set to the backwash condition as shown in connection with sand filter 51 in FIG. 2. In this condition, there will be no flow directly into filter which is being backwashed from inlet conduit 23. Instead all flow from the inlet conduit will be through filter 52 (the filter not being backwashed), and then when the water arrives at the manifold, part of the filtered effluent will flow to the left through outlet conduit 71 down through the retention screens 73 into the outlet of the shell 53 and upward through the sand-bed 55a where it fluffs it and flushes stray material as schematically illustrated in FIG. 2. Thence, the water will flow through the distributor, down through the distributor pipe and out the flushing outlet 98. Ordinarily, this backwashing operation is not continued for a particularly long period of time. It will be noted that the filtered effluent water will be supplied to the manifold at the same time that also supplied for backwashing purposes, so that the backwashing does not shut off the irrigation supply, nor introduce unfiltered water to either of the sand filters during the backwashing operation.

Should sand filter 52 be backwashed, then sand filter 51 will be placed in its forward-flow condition and the sand filter 52 in its backwash condition which is a reversal of the illustrated setting of three-way valves 92 and 93.

In all of the embodiments wherein the retention screens are utilized, the retention screen will have an aperture size less than that of the sand in the filter itself. Accordingly, should there be any failure in the sand filter, this sand will be caught upon the retention screen which will soon become plugged and shut down that part of the system, but the retention screen will not pass particulate matter which can be deleterious to the downstream operation of the drip irrigation system. Accordingly, these retention screens provide a visible indication of malfunction in the system and localize it for ease of service. Also, they plug the failed part of the system to stop further deterioration.

In the system of FIG. 3, the forward flow condition is shown by sand filter 121 and the backwashing condition by sand filter 120. In this condition, valves 132 and 133 are set so that liquid can flow from inlet conduit 23 through branch 23b and into prefilter 102. The mesh of the apertures of the pre-filter screens is small enough to catch material smaller than that which is retained by the sand filter. Accordingly, water which passes through the pre-filter screens is filtered to a standard of filtration even higher than that which emanates from the sand filter. Under such circumstances, one could expect these screens to plug up rather quickly, except for the fact that they are tubular and the inlet water flows along and washes them clean. Accordingly, there is a substantial flow through the second outlet port 113 of water filtered to a high-degree of filtration. The more-concentrated liquid (relative to the filterable impurities) enters the sand filter. This lessens the pressure-drop across the entire system as a whole. Accordingly, filtered water leaves the second outlet port 113 and flows through outlet conduit 138 to the manifold while a parallel flow enters the inlet 123 of the sand filter and is filtered as heretofore described, leaving the outlet 125, passing through its respective retention screen and through outlet conduit 139 to the manifold.

Sand filter 120 is shown on being backwash, valve 130 being closed, and valve 131 being opened to flow to the flushing outlet 134. Under these circumstances, the water from the sand filter 121 and its pre-filter 102 will divide at the manifold and some of it will flow back through outlet conduits 137 and 136 respectively into pre-filter 101 where it flows backwardly through screen 107 to wash and clean it and also backwardly through the sand filter 120 to fluff and clean it. These two backflow streams are joined to exhaust through flushing outlet 134. When the backwash operation is concluded, valves 130 and 131 will be set to the conditions shown for valves 132 and 133. Should backwashing of the pre-filter 102 and sand filter 121 be desired, then valves 132 and 133 will be set in the conditions shown for valves 130 and 131. While both sets of valves may be set simultaneously as shown for valves 132 and 133, the situation will not be such that they would both be set the same as shown for valves 130 and 131 because it is desirable to have a continuous irrigation supply even during the backwashing operation and this construction permits that objective to be obtained.

There has been described a drip irrigation system with components which rapidly and efficiently filter particulate matter from water supply systems to the high standards attainable with sand filters. The term "sand filter" is intended to connote any filter which utilizes beds of particulate material such as the sands, diatomaceous earth, clays and the like, known in the filtration art, and particularly in the swimming pool water filtration art. These are characterized by beds of particulate material which tend to remain in place on suitable supporting structures. The pressure-drops are minor and standards of performance are high.

The drip irrigation systems shown are easily adjustable, subject to ready inspection, and to measurement of pressures throughout the system by convenient devices usable by relatively unskilled persons.

This invention is not to be limited by the embodiments shown in the drawings and described in the description which are given by way of example and not of limitation, but only in accordance with the scope of the appended claims.

I claim:

1. A drip irrigation system comprising in combination: an inlet conduit to receive a supply of water to be distributed; a sand filter system comprising at least two sand filters, each having an inlet and an outlet; a manifold connected to and receiving filtered water from said outlets, the inlet conduit being connected to the said inlets, the inlets and outlets being connected in parallel through the respective sand filters, the inlets being connected to each other, and the outlets being connected to each other; valving means connected to each of said sand filters so disposed and arranged as selectively to connect or to disconnect the inlet conduit to or from each inlet, and selectively to connect or to disconnect the respective inlet to a flushing outlet; a plurality of distribution conduits connected to and receiving water from said manifold; and at least one emitter connected to each distribution conduit for emitting water therefrom.

2. A system according to claim 1 in which an adjustable valve is disposed in each distribution conduit between the manifold and the emitters to adjust the rate of flow of water into the distribution conduit.

3. A system according to claim 1 in which a penetrable plug is disposed in at least one of said distribution conduits, said plug being penetrable by a probe and self-sealing to close the puncture caused by said penetration after the probe is removed.

4. A system according to claim 3 in which one of said plugs is disposed in each of said distribution conduits.

5. A system according to claim 1 in which a dump valve is disposed in each of said distribution conduits whereby to enable its respective distribution conduit to be purged.

6. A system according to claim 1 in which a fertilizer injector system discharges a metered quantity of liquid fertilizer into the inlet conduit or into the manifold.

7. A system according to claim 1 in which valving means comprising a three-way valve is connected to the inlet of each respective sand filter, to the inlet conduit, and to a flushing outlet.

8. A drip irrigation system comprising in combination: an inlet conduit to receive a supply of water to be distributed; a sand filter adapted to be backwashed connected to said inlet conduit, a manifold receiving filtered water from said sand filter; a plurality of distribution conduits connected to and receiving water from said manifold; at least one emitter connected to each distribution conduit for emitting water therefrom; a retention screen having screen apertures proportioned to retain sand from the sand filter disposed in the flow of water between the sand filter and the distribution conduits; and a sight-glass adjacent to the retention screen for visual inspection of said retention screen.

9. A drip irrigation system comprising in combination: an inlet conduit to receive a supply of water to be distributed; at least one sand filter adapted to be backwashed having an inlet connected to said inlet conduit and having an outlet; a manifold receiving filtered water from said outlet; a retention screen disposed between the outlet and the manifold, the retention screen having apertures proportioned to retain sand from the sand filter; a sight-glass adjacent to the retention screen for visual inspection of said retention screen; a plurality of distribution conduits connected to and receiving water from said manifold; and at least one emitter connected to each distribution conduit for emitting water therefrom.

10. A system according to claim 9 in which the system includes at least two sand filters, each having an inlet and an outlet respectively connected to the inlet conduit and to the manifold, whereby their outlets are interconnected, and in which one of said retention screens and sight-glasses are disposed between each outlet and the manifold.

11. A drip irrigation system comprising in combination: an inlet conduit to receive a supply of water to be distributed; a sand filter system adapted to be backwashed connected to said inlet conduit comprising at least one sand filter having an inlet connected to the inlet conduit, and an outlet; a manifold receiving filtered water from said sand filter outlet; a plurality of distribution conduits connected to and receiving water from said manifold; at least one emitter connected to each distribution conduit for emitting water therefrom; a pre-filter including a chamber having an inlet port and a first and a second outlet port; and a screen dividing the chamber into a flow chamber and an outlet chamber, the first outlet port discharging from the flow chamber, and the second outlet port discharging from the outlet chamber, the second outlet port being connected to the outlet of the sand filter, the inlet port being connected to the inlet conduit, and the first outlet port being connected to the inlet of the sand filter.

12. A system according to claim 11 in which valving means is disposed between the inlet conduit and the inlet port, and between the outlet port and a flushing outlet, whereby to provide the capacity for fluid flow through the chamber selectively from the inlet port to its two outlet ports, or from its second to its first outlet port.

13. A system according to claim 11 in which a retention screen with apertures proportioned to retain sand from the sand filter is disposed across the flow between the said second outlet port and the manifold, and between the sand filter outlet and the manifold, and in which a sight-glass is disposed adjacent to each retention screen for visual inspection thereof.

14. A system according to claim 12 in which an adjustable valve is disposed in each distribution conduit between the manifold and the emitters to adjust the rate of flow of water into the distribution conduit.

15. A system according to claim 13 in which a penetrable plug is disposed in at least one of said distribution conduits, said plug being penetrable by a probe and self-sealing to close the puncture caused by said penetration after the probe is removed.

16. A drip irrigation system comprising in combination: an inlet conduit to receive a supply of water to be distributed; a sand filter system adapted to be backwashed connected to said inlet conduit comprising at least two sand filters, each having an inlet connected to the inlet conduit, and an outlet; a manifold receiving filtered water from said outlets, a plurality of distribution conduits connected to and receiving water from said manifold; at least one emitter connected to each distribution conduit for emitting water therefrom; a pair of pre-filters, each of which has a chamber with an inlet port and a first and a second outlet port; and a screen dividing each chamber into a flow chamber and an outlet chamber, the respective first outlet port discharging from the flow chamber, and the respective second outlet port discharging from the outlet chamber, the respective first outlet port being connected to the inlet of the respective sand filter, and the second outlet port being connected to the outlet of the respective sand filter.

17. A system according to claim 16 in which a retention screen having apertures proportioned to retain sand from the respective sand filter is disposed across the flow between each of the said second outlet ports and the manifold, and between each of the sand filter outlets and the manifold, and in which a sight-glass is disposed adjacent to each retention screen for visual inspection of the respective retention screen.

18. A system according to claim 17 in which valving means is disposed between the inlet conduit and each inlet port, and between each first outlet port and a flushing outlet, whereby to provide the capacity for fluid flow through each chamber selectively from its inlet port to its two outlet ports, or from its second outlet port to its first outlet port.

19. A system according to claim 11 in which the screen in the pre-filter is formed as a tube, said tube interconnecting the inlet port and the first outlet port.

20. A system according to claim 16 in which the screen in each of the pre-filters is formed as a tube, said tube interconnecting the respective inlet port and first outlet port.

21. A system according to claim 8 in which an adjustable valve is disposed in each distribution conduit between the manifold and the emitters to adjust the rate of flow of water into the distribution conduit.

22. A system according to claim 8 in which a penetrable plug is disposed in at least one of said distribution conduits, said plug being penetrable by a probe and self-sealing to close the puncture caused by said penetration after the probe is removed.

23. A system according to claim 22 in which one of said plugs is disposed in each of said distribution conduits.

24. A system according to claim 8 in which a dump valve is disposed in each of said distribution conduits whereby to enable its respective distribution conduit to be purged.

25. A system according to claim 8 in which a fertilizer injector system discharges a metered quantity of liquid fertilizer into the inlet conduit or into the manifold.

26. A system according to claim 11 in which an adjustable valve is disposed in each distribution conduit between the manifold and the emitters to adjust the rate of flow of water into the distribution conduit.

27. A system according to claim 11 in which a penetrable plug is disposed in at least one of said distribution conduits, said plug being penetrable by a probe and self-sealing to close the puncture caused by said penetration after the probe is removed.

28. A system according to claim 27 in which one of said plugs is disposed in each of said distribution conduits.

29. A system according to claim 11 in which a dump valve is disposed in each of said distribution conduits whereby to enable its respective distribution conduit to be purged.

30. A system according to claim 11 in which a fertilizer injector system discharges a metered quantity of liquid fertilizer into the inlet conduit or into the manifold.

31. A system according to claim 16 in which an adjustable valve is disposed in each distribution conduit between the manifold and the emitters to adjust the rate of flow of water into the distribution conduit.

32. A system according to claim 16 in which a penetrable plug is disposed in at least one of said distribution conduits, said plug being penetrable by a probe and self-sealing to close the puncture caused by said penetration after the probe is removed.

33. A system according to claim 32 in which one of said plugs is disposed in each of said distribution conduits.

34. A system according to claim 16 in which a dump valve is disposed in each of said distribution conduits whereby to enable its respective distribution conduit to be purged.

35. A system according to claim 16 in which a fertilizer injector system discharges a metered quantity of liquid fertilizer into the inlet conduit or into the manifold.

* * * * *